United States Patent
Kagawa

(10) Patent No.: US 6,941,563 B2
(45) Date of Patent: *Sep. 6, 2005

(54) DISK PLAYER USING A SINGLE SWITCH IN COMMON FOR DRIVING ITS TRAY AND DRIVE MOTOR

(75) Inventor: Yoshiharu Kagawa, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 132 days.

This patent is subject to a terminal disclaimer.

(21) Appl. No.: 10/409,109

(22) Filed: Apr. 9, 2003

(65) Prior Publication Data

US 2003/0193872 A1 Oct. 16, 2003

(30) Foreign Application Priority Data

Apr. 10, 2002 (JP) ........................................ 2002-108078

(51) Int. Cl.[7] ................................................. G11B 33/02
(52) U.S. Cl. ........................................................ 720/608
(58) Field of Search ................................. 720/608, 661; 369/30.98, 75.11, 75.21, 77.11, 77.21, 215.1, 219.1, 75.1, 75.2, 77.1, 77.2, 215, 219

(56) References Cited

U.S. PATENT DOCUMENTS

| | | | | |
|---|---|---|---|---|
| 4,701,901 A | * | 10/1987 | Imai ........................... | 720/608 |
| 5,119,357 A | * | 6/1992 | Tsuruta et al. .............. | 720/608 |
| 5,563,865 A | * | 10/1996 | Wheeler ...................... | 720/608 |
| 5,572,497 A | * | 11/1996 | Kim et al. ................... | 720/632 |
| 5,633,850 A | * | 5/1997 | Park ........................... | 720/608 |
| 5,636,198 A | * | 6/1997 | Maeng ...................... | 369/30.98 |
| 6,169,711 B1 | * | 1/2001 | Koh .......................... | 369/30.36 |
| 6,335,914 B2 | * | 1/2002 | Tanaka et al. .............. | 720/608 |

FOREIGN PATENT DOCUMENTS

| | | | | |
|---|---|---|---|---|
| JP | 62-183081 | * | 8/1987 |
| JP | 1-134749 | * | 5/1989 |
| JP | 1-227284 | * | 9/1989 |
| JP | 3-147562 | * | 6/1991 |
| JP | 6-314459 | * | 11/1994 |
| JP | 7-334911 | * | 12/1995 |
| JP | 9-027180 | | 1/1997 |
| JP | 10-154366 | * | 6/1998 |

* cited by examiner

Primary Examiner—Angel Castro
(74) Attorney, Agent, or Firm—Wenderoth, Lind & Ponack, L.L.P.

(57) ABSTRACT

Disclosed is a disk player using a single motor in common for driving a disk tray and optical pickup. Controlled reciprocation of the disk tray and the data-reproducing operation subsequent to withdrawal of the disk tray into the housing can be performed by the "L"-shaped guide slot made in the disk tray, a cam rod operatively connected to the "L"-shaped guide slot, and the drive switching gear assembly operatively connected to the cam rod and the first train of gears for driving the disk tray. All of these parts work together so that the single drive motor may switch and drive the first train of gears for driving the disk tray or the second train of gears for driving the optical pickup. A cam position-detecting switch is operatively connected to the cam rod for detecting arrival of the cam rod at either terminal of its travel, that is, the gear train connecting or gear train-disconnecting position.

6 Claims, 10 Drawing Sheets

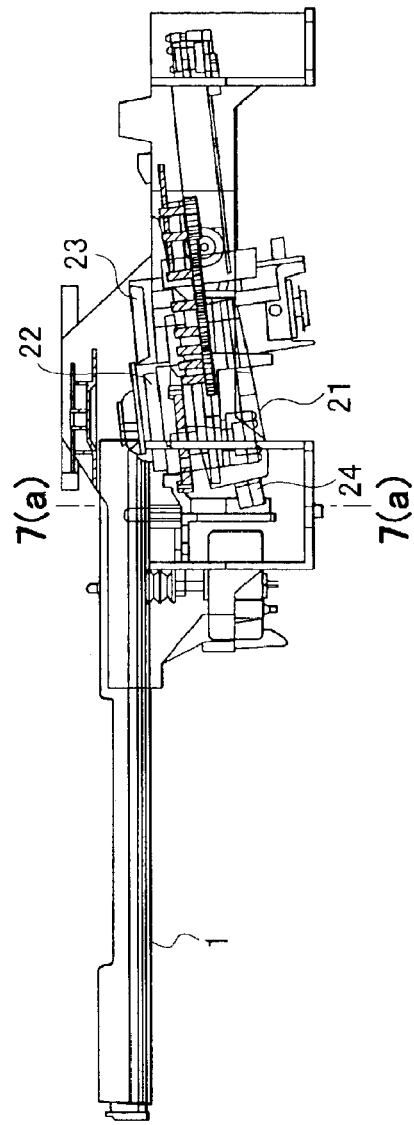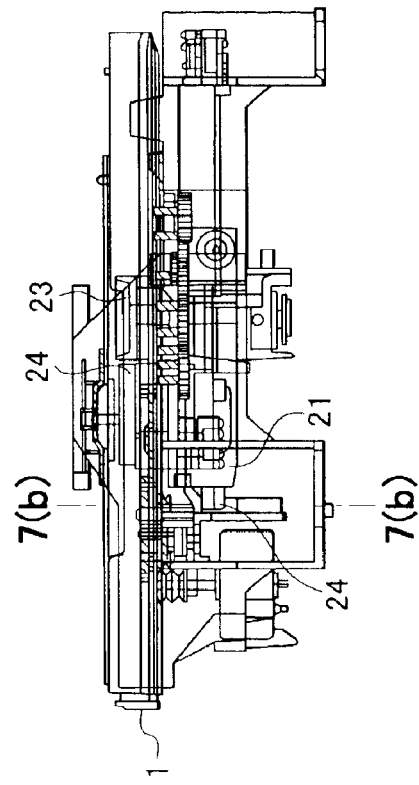

DISK PLAYER USING A SINGLE SWITCH IN COMMON FOR DRIVING ITS TRAY AND DRIVE MOTOR

BACKGROUND OF THE INVENTION

1. Field of the Invention

The present invention relates to a disk player for use in recording and reproducing data in an optical disc or a magneto-optical disc such as a CD, DVD, or MD, using a switch in common for putting different drive systems in operation.

2. Related Art

A disk player comprises a disk tray movable between the opening position in which the disk tray appear out of the housing and the closing position in which the disk tray enters the housing, a turn table bearing a disk, a turn table drive, an optical pickup, an optical pickup drive and other movable parts. Motors are allotted to the drive systems to enable their movable parts to function as required.

JP 9-27180A, titled "Disk Player" proposes a disk drive mechanism which is swingable about its pivot between a horizontal position in which the mechanism is flush with the disk tray and an oblique position in which the mechanism inclines downward apart from the disk tray. The disk drive mechanism is raised from the oblique to horizontal position prior to the advance of the disk tray out of the casing, and it is inclined from the horizontal to oblique position posterior to the withdrawal of the disk tray into the housing.

The disk tray has a tray rack and a tray drive gear is meshed with this tray rack. The disk tray moves back and force according to rotation of the tray drive gear. The tray drive gear is meshed with a rack arranged at one end of a cam rod to move the cam rod in the left and right directions, while making the driving mechanism to swing in the upward and downward directions. That is, the disk tray moves back and force, and at the same time the driving mechanism swings according to rotation of the tray drive gear.

Both positions the disk tray moves force to be opened and back to be closed must be established precisely. For that purpose, a guide frame is made on the back surface of the disk tray for a boss projected from the cam rod to movably fit therein so that the disk tray be closed at a correct position. The opening position of the disk tray is controlled by a limit switch for stopping the force movement.

As mentioned above, a limit switch for stopping the force movement of the disk tray is used to decide the opening and closing positions of the disk tray. One object of the present invention is to provide a disk player using a single limit switch to control precisely the opening and closing positions of the disk tray and give signals to commence the next motion.

SUMMARY OF THE INVENTION

To attain this object a disk player according to the present invention comprises a housing a disk tray movable between the opening position in which the disk tray appears out of the housing and the closing position in which the disk tray enters the housing, the disk tray having a tray rack and an "L"-shaped tray guide slot, of which the longitudinal guide slot section extends parallel to the tray rack and a lateral guide slot section extends parallel to the front side of the disk tray. A first train of gears for moving the disk tray back and forth between the opening and closing position, one of the first train of gears meshing with the tray rack in the form of a rack-and-pinion. A movable optical pickup is provided, and a second train of gears moves the optical pickup radially across the disk. A cam rod movable between the gear train-connecting position in which the first and second trains of gears are coupled and the gear train-disconnecting position in which the first and second trains of gears are disconnected, the cam rod being operatively connected to the "L"-shaped tray guide slot; a switching drive gear assembly operatively connected to the cam rod for swinging between the gear train-connecting position and the gear train-disconnecting position; a drive motor connected to the first train of gears; and a cam position detecting switch operatively connected to the cam rod for detecting arrival of the cam rod at either terminal of its travel, the cam rod being so formed that when the first train of gears moves the disk tray toward the opening or closing position with the rack-and-pinion, the cam rod remains in the gear train-disconnecting position, and that in the closing position the rack-and-pinion is disconnected to permit the separate pinion to move the cam rod to the gear train-connecting position, making the drive switching gear assembly swing about its drive until the first and second trains of gears are connected to allow the drive motor to drive the second train of gears for moving the optical pickup while the first train of gears rotate without moving the disk tray.

The cam rod comprises an orthogonal, horizontal-and-vertical guide plate assembly, the horizontal guide plate having a relatively narrow guide slot, a relatively wide guide slot, and a wide-to-narrow transient slope, thus making the swinging drive gear assembly swing toward the second train of gears when the axle of the swinging drive gear assembly remains in the relatively narrow guide slot, and making the drive switching gear assembly swing apart from the second train of gears when the axle of the swinging drive gear assembly remains in the relatively wide guide slot.

The support member on which the second train of gears and the optical pickup are fixed is adapted to turn about its pivot between the horizontal position and the oblique position, and the cam rod comprises an orthogonal, horizontal-and-vertical guide plate assembly, the vertical guide plate having an "escalator"-like slot to catch the free end of the support member, thus making the support member turn about its pivot until the second train of gears rises to be flush with the drive switching gear assembly when the cam rod reaches the gear train connecting position.

The cam position detecting switch is a snap switch fixed to the housing at such a position that its arm may be caught by first and second projections of the cam rod, which first and second projections are so positioned that the first projection abuts on the arm of the snap switch when the cam rod reaches the gear train-disconnecting position, and that the second projection abuts on the arm of the snap switch when the cam rod reaches the gear train-connecting position.

Other objects and advantages of the present invention will be understood from the following description of a disk drive according to one embodiment of the present invention, which is shown in accompanying drawings.

BRIEF DESCRIPTION OF THE DRAWING

FIG. 6(a) is a side view of the disk player with its disk tray pushed out of the housing while FIG. 6(b) is a similar side view, but showing the disk player with its disk tray pulled in the housing;

FIG. 9(a) is a cross section of the disk player similar to FIGS. 7(a) and 7(b), but illustrating how the cam position detecting switch detects arrival of the cam rod at the gear train-disconnecting position whereas FIG. 10(a) is a similar cross section, but illustrating how the cam position detecting switch detects arrival of the cam rod at the gear train-connecting position, whereas

DETAILED DESCRIPTION OF PREFERRED EMBODIMENT

Figure 1:
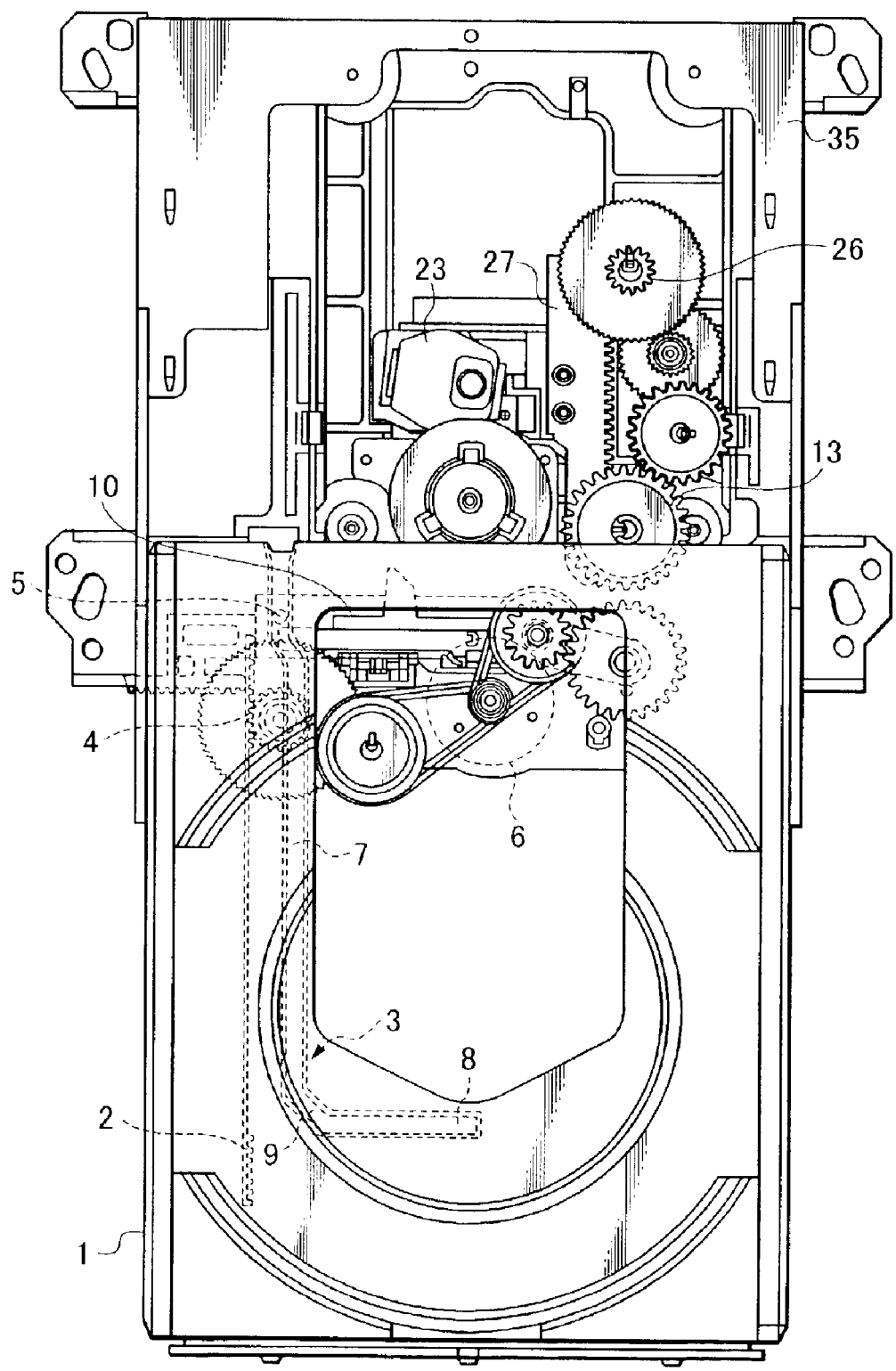
FIG. 1 is a plane view of a disk player according to one embodiment of the present invention with its disk tray appearing out of the housing.
Figure 5A:
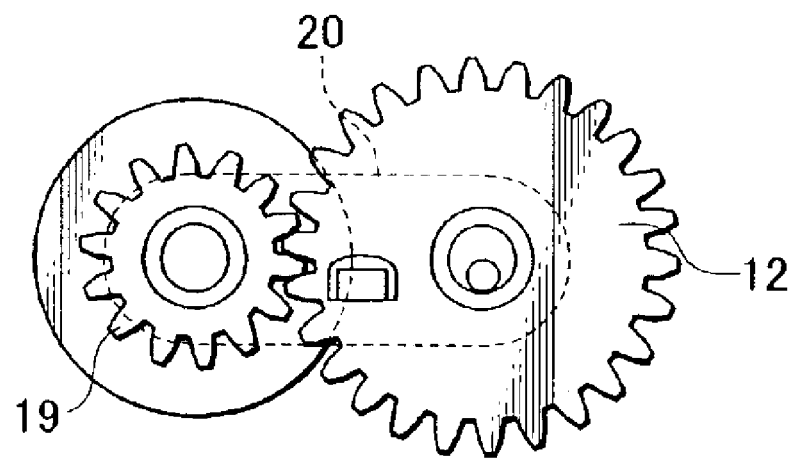
FIGS. 5(a) and 5(b) are plane and side views of a drive-switching gear assembly.
Figure 5B:
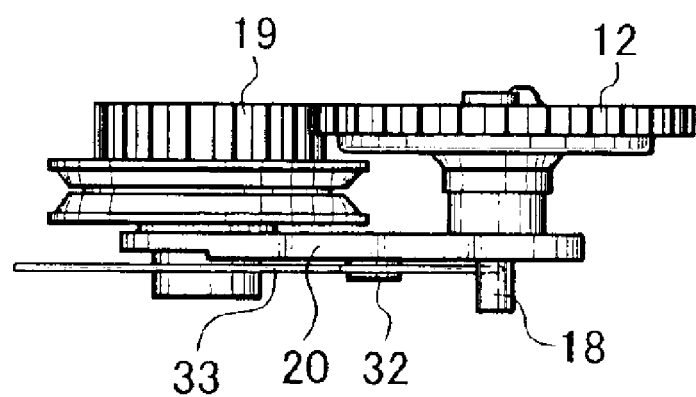
Figure 7A:
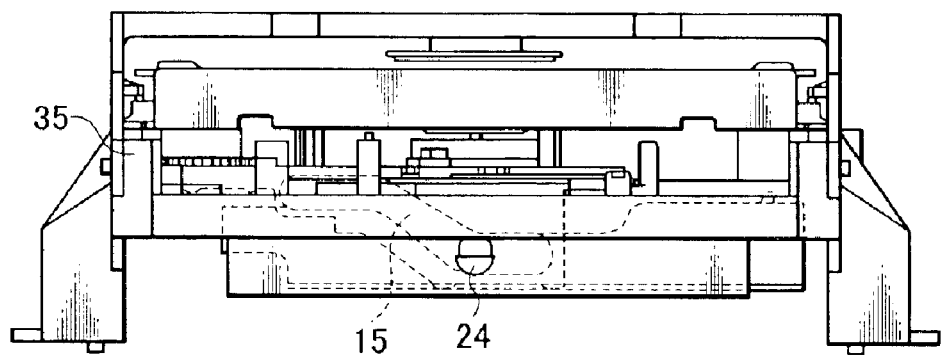
FIGS. 7(a) and 7(b) are cross sections of the disk player taken along the line "7(a)"—"7(a)" in FIG. 6(a), and taken along the line "7(b)"—"7(b)" in FIG. 6(b) respectively.
Figure 7B:
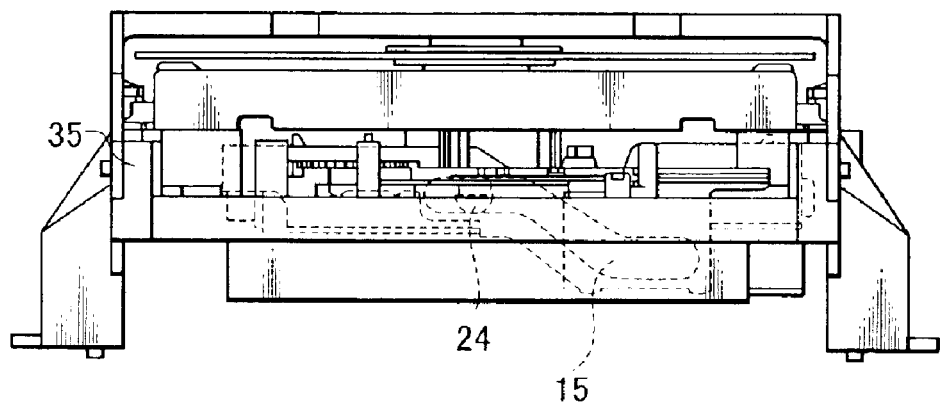

Referring to FIG. 1, the disk player has its disk tray 1 put in opening position, in which the disk tray 1 appears from the casing 35. The disk tray 1 has a circular depression made on its upper surface for accommodating a disk. It has a tray rack 2 and an "L"-shaped guide slot 3 made on its lower surface. First and second trains of gears allotted for driving the disk tray 1 and the optical pickup 23 respectively are mounted in the housing 35. The first train of gears can be detachably coupled with the second train of gears via an intervening drive switching gear assembly (FIG. 5) and a cam rod 10 (FIG. 3). The cam rod 10 has its boss 5 movably fitted in the guide slot 3. The tray rack 2 and associated tray drive gear 4 are combined to provide a rack-and-pinion, which can move the disk tray 1 back and force when the drive motor 6 is energized to drive the first train of gears.

Figure 2:
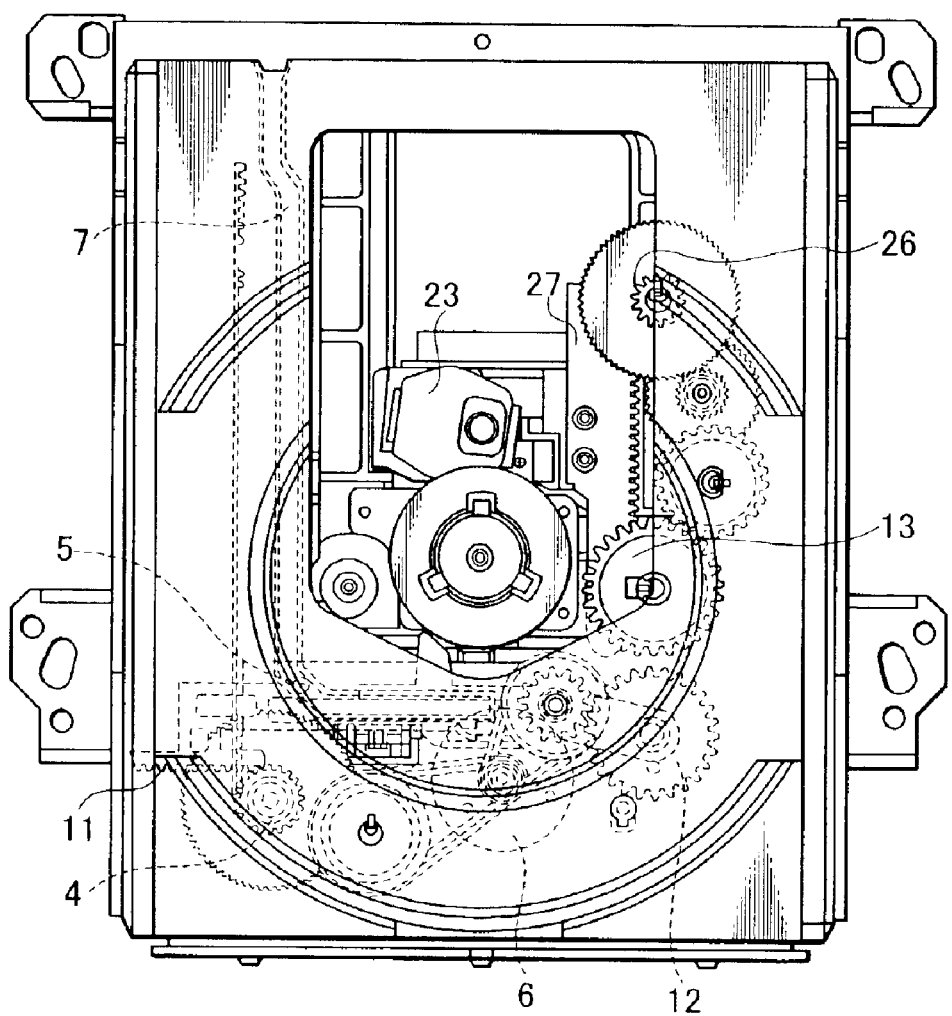
FIG. 2 is a plane view of the disk player with its disk tray entering the housing.

When the drive motor 6 rotates the tray drive gear counterclockwise, the disk tray 1 is made to advance a predetermined distance, reaching the opening position (FIG. 1), and when the drive motor 6 rotates the tray drive gear clockwise, the disk tray 1 is made to withdraw the predetermined distance, reaching the closing position (FIG. 2). This controlled reciprocation and the data-reproducing operation subsequent to withdrawal of the disk tray 1 in housing 35 can be performed by the unique mechanism according to the present invention, which comprises the "L"-shaped guide slot 3, the cam rod 10 operatively connected to the "L"-shaped guide slot 3, and the drive-switching gear assembly 12 and 19 operatively connected to the cam rod 10 and the first train of gears. All of these parts work together so as to permit the single drive motor 6 to switch and selectively drive the disk tray 1 or the optical pickup 23.

Figure 3A:
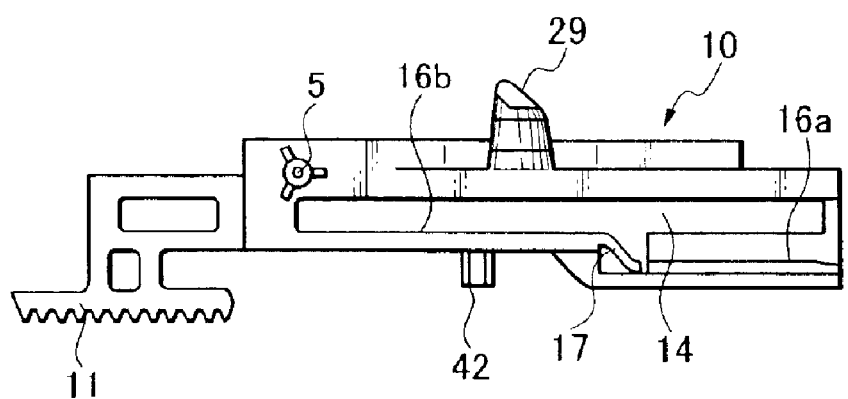
FIGS. 3(a) and 3(b) are plane and side views of a cam rod which can traverse the housing.
Figure 3B:
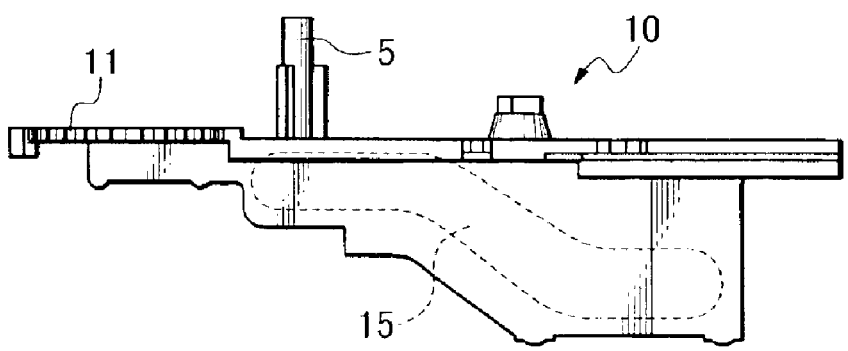

As shown in FIG. 1, the "L"-shaped guide slot 3 is composed of a longitudinal slot section 7, a lateral slot section 8, and a longitudinal-to-lateral transient slot section 9. Longitudinal slot section 7 is bent in the vicinity of its end as indicated at 30. Referring to FIG. 3, the cam rod 10 comprises an orthogonal, horizontal-and-vertical guide plate assembly. As shown in the drawing, the horizontal guide plate has cam rack 11 formed at one end on one longitudinal side, a boss 5 standing upright close to the one end, a longitudinal guide groove 14, a projection 42 formed on the one longitudinal side, a chamfered projection 29 formed on the other longitudinal side (see FIG. 3a). The guide groove 14 comprises a relatively narrow groove section 16b, a relatively wide groove section 16a and an oblique, narrow-to-wide groove transient section 17. On the other hand, a vertical guide plate has an "escalator-like" guide groove 15 made therein (FIG. 3b). Finally referring to FIG. 5, a drive-switching gear assembly comprises a drive-switching gear 12 and an associated gear 19, both connected by an arm 20. The arm 20 has a projection 32, and a stationary spring wire 33 is caught by the projection 32, pushing the drive switching gear 12 apart from the leading gear or pickup-feeding gear 13 of the second train of gears. Thus, the drive-switching gear assembly is normally spring-biased toward the disconnecting position in which the first train of gears for driving the disk tray 1 is disconnected from the second train of gears for driving the pickup 31.

Figure 4:
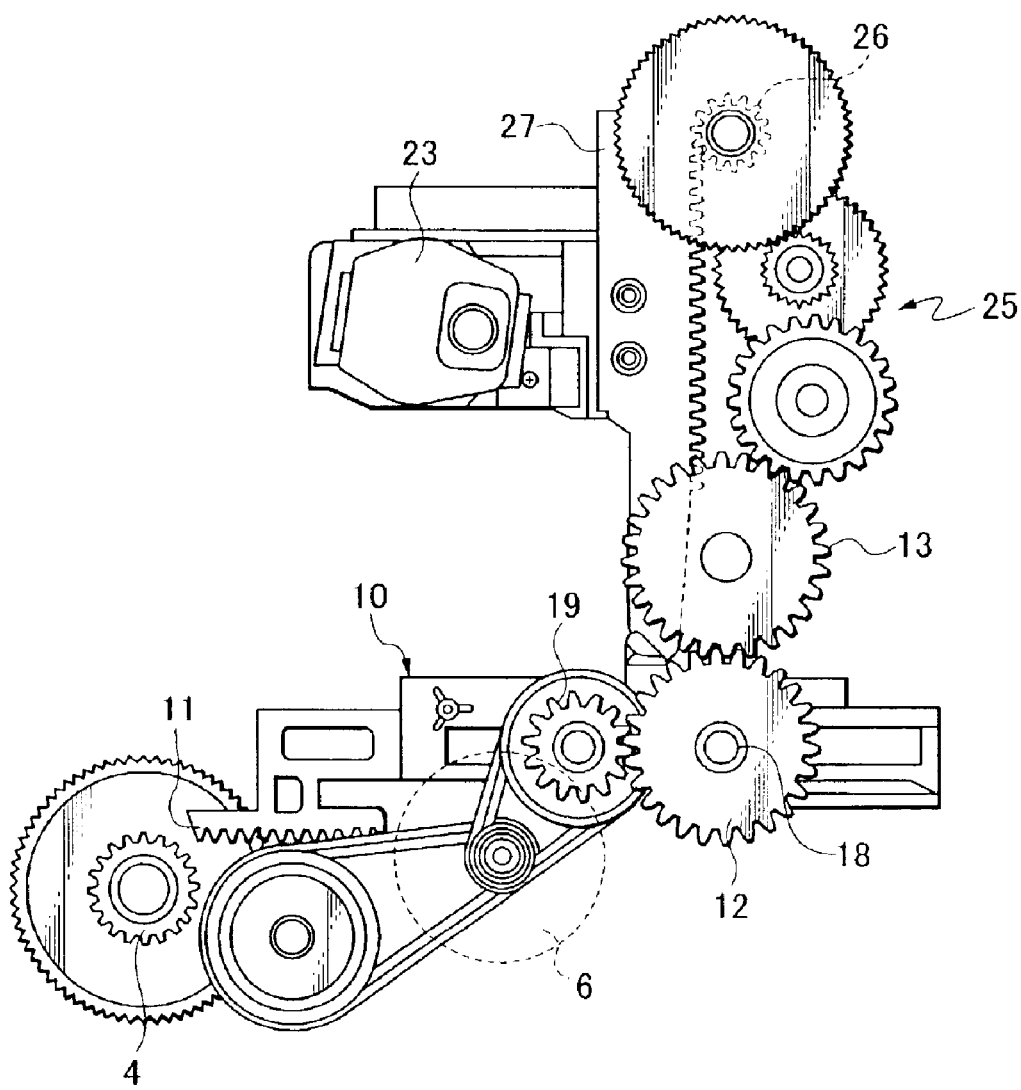
FIG. 4 illustrates how a first train of toothed wheels for driving the disk tray is coupled with a second train of toothed wheels for driving the optical pickup through the agency of the drive-switching gear assembly and the cam rod, which is driven rightward in the drawing.

The drive-switching gear 12 has its axle 18 inserted in the guide groove 14 of the guide rod 10. In the disconnecting position the axle 18 remains in the relatively wide groove section 16a. The rightward-movement of the cam rod 10 makes the axle 18 climb the oblique, narrow-to-wide groove transient section 17 to enter the relatively narrow groove section 16b, thereby pushing the drive-switching gear 12 toward the leading gear 13 of the second train of gears, that is, the pickup-feeding gear 13 against the counter spring-bias 33 until the drive-switching gear 12 meshes with the pickup-feeding gear 13 (FIG. 4). In the connecting position thus reached the optical pickup 23 can be driven by the drive motor 6 through the agency of the second train of gears and an associated rack-and-pinion 27 and 26. Then, the optical pickup 31 traverses the disk in its radial direction to reproduce data therefrom.

More specifically, when the drive motor 6 drives the rack-and-pinion 2 and 4 via the first train of gears to move the disk tray 1 toward the opening position, first, the boss 5 of the cam rod 10 follows the longitudinal slot section 7, and it climbs the bent portion 30 to draw the cam rod 10 leftward. Arrival of the cam rod 10 at the farthest left position is detected to stop the drive motor 6. Thus, the disk tray 1 stops after traveling a predetermined distance substantially equal to the longitudinal slot section 7 (see FIG. 1).

Conversely when the motor 6 drives the rack-and-pinion 2 and 4 to pull the disk tray 1 toward the closing position, the boss 5 of the cam rod 10 follows the longitudinal slot section 7, and then the boss 5 follows the lateral slot section 8 after passing the longitudinal-to-lateral transient section 9. Then, the disk tray 1 is put in closing position (see FIG. 2), and the tray driving gear 4 leaves the tray rack 2 to mesh with the cam rack 11 of the cam rod 10 to move the cam rod 10 rightward as the drive motor 6 continues rotating. Thus, the boss 5 of the cam rod 10 advances in the lateral slot section 8 rightward.

When the boss 5 reaches the dead-end of the lateral slot section 8 to draw the cam rod 10 to the farthest right position, the axle 18 of the drive switching gear 12 is pulled up from the relatively wide slot section 16a to the relatively narrow slot section 16b against the counter bias-spring 33, thus making the drive switching gear assembly swing about its pivot so that the drive-switching gear 12 moves toward the pickup feeding gear 13.

Referring to FIGS. 6(a) and 6(b), and FIGS. 7(a) and 7(b), the traverse holder 21 bearing the second train of gears has its tip boss 24 movably fitted in the "escalator"-like guide slot 15 of the cam rod 10. As the disk tray 1 moves from the opening position to closing position, the tip boss 24 of the traverse holder 21 climbs the "escalator"-like guide slot 15, and accordingly the traverse holder 21 turns about its pivot from the inclined position (see FIGS. 6(a) and 7(a)) to the horizontal position (see FIGS. 6(b) and 7(b)), thereby raising the second train of gears, particularly the pickup feeding gear 13 to be flush with the drive-switching gear 12. Thus, the pickup feeding gear 13 meshes with drive switching gear 12, permitting the drive motor 6 to drive the second train of gears. Thus, the optical pickup 21 is driven by the drive motor 6 through the agency of the rack-and-pinion 26 and 27 associated with the second train of gears (see FIG. 4).

Figure 8:
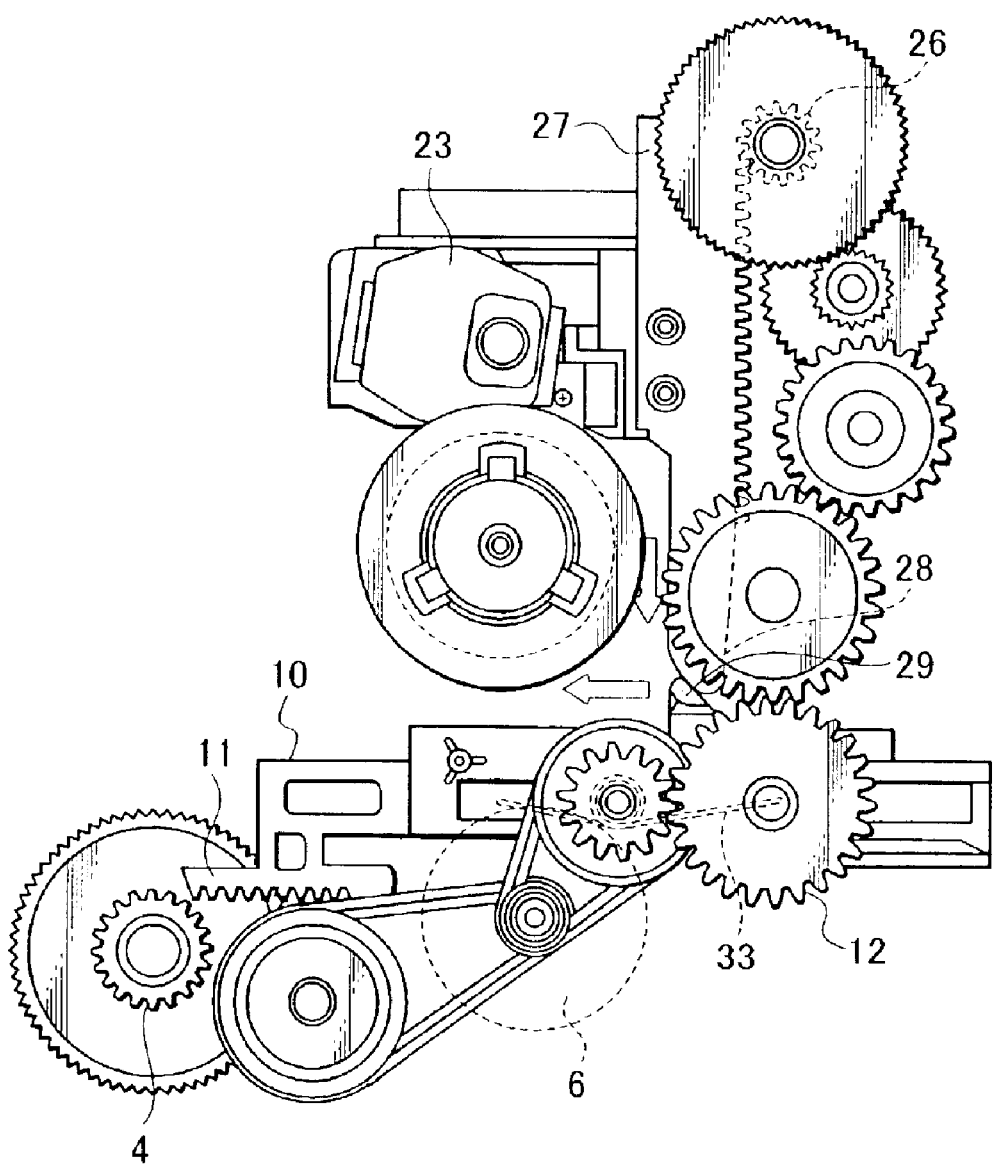
FIG. 8 is similar to FIG. 4, but illustrating how the cam rod is moved leftward from the cam rod position of FIG. 4, thereby disconnecting the first train of toothed wheels from the second train of toothed wheels.

In the connecting position the optical pickup 31 moves across the disk in its radial direction to record or reproduce data from the disk while the chamfered end of rack 27 continues pushing the counter chamfered end of the projection 29 of the cam rod 10, thus pushing the cam rod leftward until the drive switching gear 12 of the drive-switching gear assembly rolls down on the narrow-to-wide transient incline 17 to leave the pick-up feeding gear 13 of the second gang of gears as the pulling force from the spring bias 32 is applied to the drive switching gear 12 all the time (see FIG. 8). Thus, the optical pickup 31 stops traversing the disk.

Figure 9A:
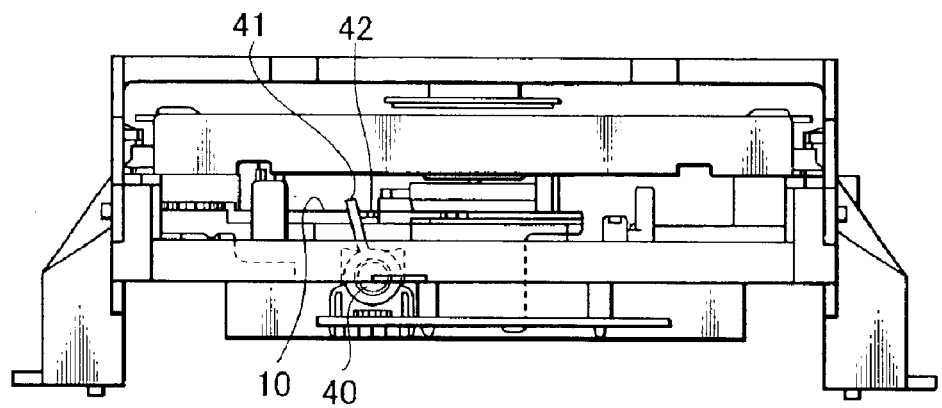
Figure 9B:
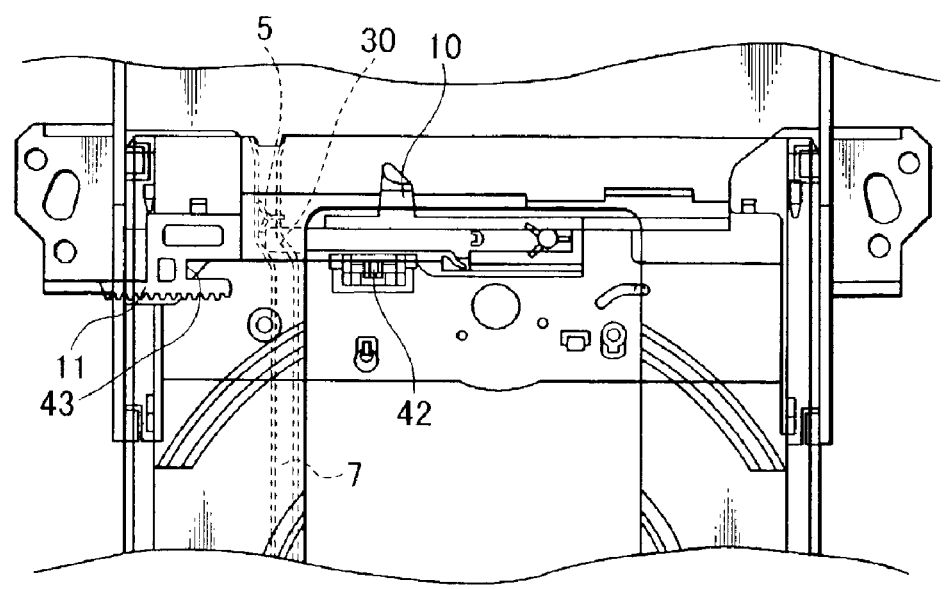
FIG. 9(b) is a plane view of a fragment of the disk player, illustrating the same area and position as FIG. 9(a)

Referring to FIGS. 9(a) and 9(b), the cam position-detecting switch 40 is a snap switch 40 fixed to the housing 35. When the cam rod 10 reaches the gear train-disconnecting position 43 (the farthest left position), the arm 41 of the snap switch 40 is caught by the recess formed by the cam rack 11, thus causing the snap switch 40 to be thrown to one side.

Figure 10A:
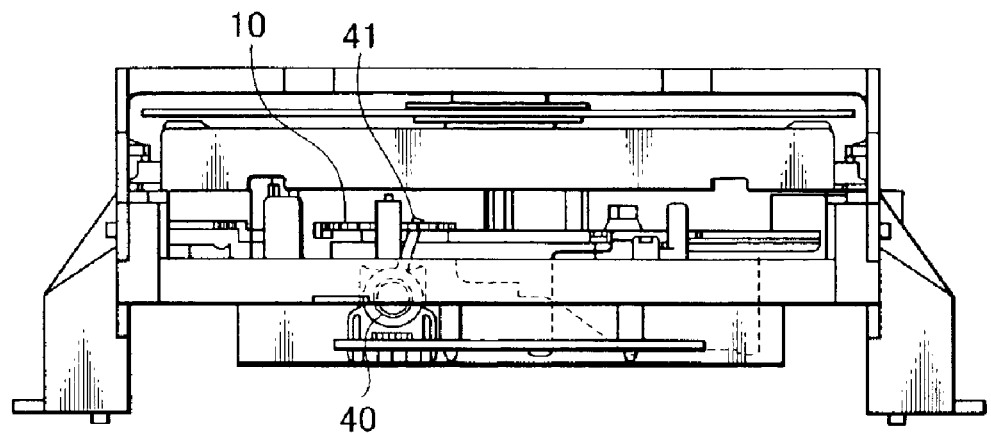
Figure 10B:
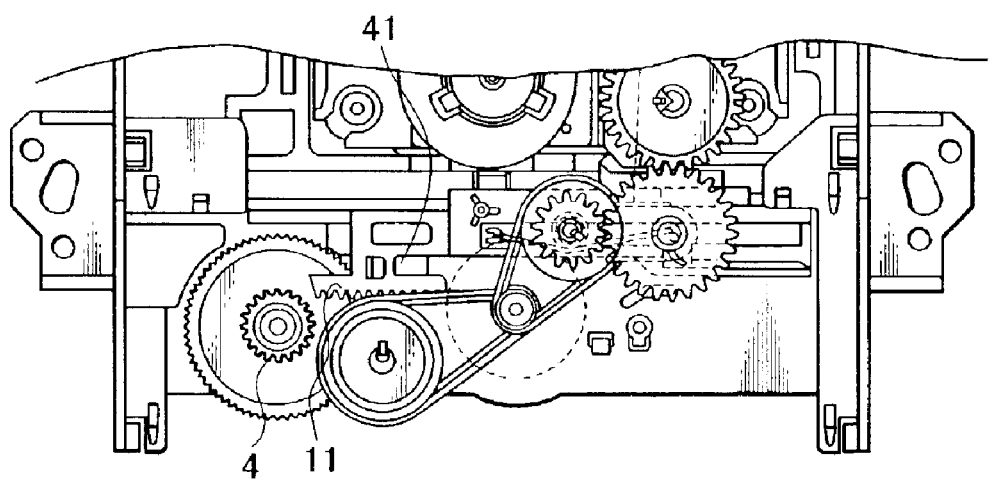
FIG. 10(b) is a plane view of a fragment of the disk player, illustrating the same area and position as FIG. 10(a).

Referring to FIGS. 10(a) and 10(b), when the cam rod 10 reaches the gear train-connecting position (the farthest right position), the arm 41 of the snap switch 40 is caught by the projection 42 of the cam rod 10, thus making the snap switch 40 to be thrown to the other side.

As may be understood from the above the controlled reciprocation of the disk tray and the data-reproducing operation subsequent to withdrawal of the disk tray in the housing can be performed by making the "L"-shaped guide slot, the cam rod and the drive-switching gear assembly work in unison, permitting the single drive motor to timely switch and selectively drive the disk tray or the optical pickup.

What is claimed is:

1. A disk player comprising:
   a housing;
   a disk tray movable between an opening position in which the disk tray appears out of the housing and a closing position in which the disk tray enters the housing, the disk tray having a tray rack and an "L"-shaped tray guide slot, of which a longitudinal guide slot section extends parallel to the tray rack and a lateral guide slot section extends parallel to a front side of the disk tray;
   a first train of gears for moving the disk tray back and forth between the opening and closing position, one of the first train of gears meshing with the tray rack in the form of a rack-and-pinion; a movable optical pickup; a second train of gears for moving the optical pickup radially across a disk; a cam rod movable between a gear train-connecting position in which the first and second trains of gears are coupled and the gear train-disconnecting position in which the first and second trains of gears are disconnected, the cam rod being operatively connected to the "L"-shaped tray guide slot;
   a switching drive gear assembly operatively connected to the cam rod for swinging between the gear train-connecting position and the gear train-disconnecting position;
   a drive motor connected to the first train of gears; and a cam position detecting switch operatively connected to the cam rod for detecting arrival of the cam rod at either terminal of its travel, the cam rod being so formed that when the first train of gears moves the disk tray toward the opening or closing position with the rack-and-pinion, the cam rod remains in the gear train-disconnecting position, and that in the closing position the rack-and-pinion is disconnected to permit the separate pinion to move the cam rod to the gear train-connecting position, making the switching drive gear assembly swing about its pivot until the first and second trains of gears are connected to allow the drive motor to drive the second train of gears for moving the optical pickup while the first train of gears rotates without moving the disk tray.

2. A disk player according to claim 1, wherein the cam rod comprises an orthogonal, horizontal-and-vertical guide plate assembly including a horizontal guide plate having a relatively narrow guide slot, a relatively wide guide slot, and a wide-to-narrow transient slope, thus making the drive switching gear assembly swing toward the second train of gears when an axle of the switching drive gear assembly remains in the relatively narrow guide slot, and making the switching drive gear assembly swing apart from the second train of gears when the axle of the switching drive gear assembly remains in the relatively wide guide slot.

3. A disk player according to claim 2, wherein a support member on which the second train of gears and the optical pickup are fixed is adapted to turn about a pivot between a horizontal position and an oblique position, and the horizontal-and-vertical guide plate assembly further includes a vertical guide plate having an "escalator"-like slot to catch a free end of the support member, thus making the support member turn about its pivot until the second train of gears rises to be flush with the switching drive gear assembly when the cam rod reaches the gear train connecting position.

4. A disk player according to claim 3, wherein the cam position detecting switch is a snap switch fixed to the housing at such a position that its arm may be caught by first and second projections of the cam rod, which first and second projections are so positioned that the first projection abuts on the arm of the snap switch when the cam rod reaches the gear train-disconnecting position, and that the second projection abuts on the arm of the snap switch when the cam rod reaches the gear train-connecting position.

5. A disk player according to claim 2, wherein the cam position detecting switch is a snap switch fixed to the housing at such a position that its arm may be caught by first and second projections of the cam rod, which first and second projections are so positioned that the first projection abuts on the arm of the snap switch when the cam rod reaches the gear train-disconnecting position, and that the second projection abuts on the arm of the snap switch when the cam rod reaches the gear train-connecting position.

6. A disk player according to claim 1, wherein the cam position detecting switch is a snap switch fixed to the housing at such a position that its arm may be caught by first and second projections of the cam rod, which first and second projections are so positioned that the first projection abuts on the arm of the snap switch when the cam rod reaches the gear train-disconnecting position, and that the second projection abuts on the arm of the snap switch when the cam rod reaches the gear train-connecting position.

* * * * *